(12) United States Patent
Spardel et al.

(10) Patent No.: US 10,988,220 B2
(45) Date of Patent: Apr. 27, 2021

(54) COVER DEVICE AND THRUSTER (71) Applicant: SKF MARINE GMBH, Hamburg (DE)

(72) Inventors: Holger Spardel, Hamburg (DE); Frank Albrecht, Stadtoldendorf (DE); Ulrich Albrecht, Stadtoldendorf (DE); Kai Danneberg, Hamburg (DE); Uwe Leitloff, Wennigsen (DE)

(73) Assignee: SKF MARINE GMBH, Hamburg (DE)

( * ) Notice: Subject to any disclaimer, the term of this patent is extended or adjusted under 35 U.S.C. 154(b) by 0 days.

(21) Appl. No.: 16/605,615

(22) PCT Filed: Apr. 27, 2018

(86) PCT No.: PCT/EP2018/060919
§ 371 (c)(1),
(2) Date: Oct. 16, 2019

(87) PCT Pub. No.: WO2018/202583
PCT Pub. Date: Nov. 8, 2018

(65) Prior Publication Data
US 2020/0130796 A1 Apr. 30, 2020

(30) Foreign Application Priority Data
May 2, 2017 (DE) .................. 10 2017 207 344.6

(51) Int. Cl.
*B63H 5/16* (2006.01)
(52) U.S. Cl.
CPC ..................... *B63H 5/16* (2013.01)

(58) Field of Classification Search
CPC ........... B63B 5/16; B63B 43/16; B63B 25/02; B63H 5/16
See application file for complete search history.

(56) References Cited

U.S. PATENT DOCUMENTS

| 3,151,663 | A | | 10/1964 | Bohner et al. |
| 4,033,247 | A | | 7/1977 | Murphy |
| 4,506,697 | A | * | 3/1985 | Marchant ............ F16K 11/0856 137/240 |

(Continued)

FOREIGN PATENT DOCUMENTS

| DE | 1182550 B | 11/1964 |
| DE | 2051785 A1 | 4/1972 |

(Continued)

OTHER PUBLICATIONS

International Search Report dated Nov. 8, 2018 for parent application No. PCT/EP2018/060919.

(Continued)

*Primary Examiner* — Stephen P Avila
(74) *Attorney, Agent, or Firm* — J-TEK Law PLLC; Scott T. Wakeman; Mark A. Ussai (57) ABSTRACT

A cover device for at least partially closing an underwater opening in a hull of a watercraft includes a variable-volume hollow-chamber lip assembly including at least two hollow-chamber lips and one buoyancy body. The at least one hollow-chamber lip is volume-variable by supplying a fluid to or removing a fluid from an interior thereof, and the at least one hollow-chamber lip assembly is shiftable between an expanded state and a contracted state by supplying or removing the fluid.

18 Claims, 7 Drawing Sheets

(56) References Cited

U.S. PATENT DOCUMENTS

| | | | |
|---|---|---|---|
| 4,568,291 A | | 2/1986 | Nelson |
| 4,793,658 A | | 12/1988 | Brown |
| 5,067,765 A | | 11/1991 | Frye et al. |
| 5,538,317 A | * | 7/1996 | Brocke .................... B60J 10/82 |
| | | | 296/216.09 |
| 6,056,610 A | * | 5/2000 | Fontanille .............. B63H 5/125 |
| | | | 440/54 |
| 9,623,942 B2 | | 4/2017 | Schiaffino et al. |
| 2002/0178990 A1 | | 12/2002 | McBride et al. |
| 2018/0312223 A1 | | 11/2018 | Zollenkopf et al. |

FOREIGN PATENT DOCUMENTS

| | | |
|---|---|---|
| DE | 19618761 A1 | 11/1997 |
| FR | 2213188 A1 | 8/1974 |
| JP | H0550989 A | 3/1993 |
| JP | H09295571 A | 11/1997 |
| JP | 2003276675 A | 10/2003 |
| KR | 20100031009 A | 3/2010 |
| KR | 20120063751 A | 6/2012 |
| KR | 101228644 B1 | 1/2013 |
| KR | 20130000144 U | 1/2013 |
| KR | 101259629 B1 | 4/2013 |
| KR | 101334832 B1 | 12/2013 |

OTHER PUBLICATIONS

Translation of Written Opinion for parent application No. PCT/EP2018/060919.

* cited by examiner

COVER DEVICE AND THRUSTER

CROSS-REFERENCE

This application is the U.S. National Stage of International Application No. PCT/EP2018/060919 filed on Apr. 27, 2018, which claims priority to German patent application no. 10 2017 207 344.6 filed on May 2, 2017.

TECHNOLOGICAL FIELD

The invention relates to a cover device for at least sectional closing of an opening lying under water in a hull of a watercraft, in particular an opening of a transverse channel of a thruster. In addition, the invention has a thruster, in particular a bow- or stern-thruster, as subject matter.

BACKGROUND

Modern passenger or cargo ships have in general a variety of openings lying under water. Such openings serve, for example, for the suction of cooling water from the fairway water and for the reintroduction of the heated cooling water into the fairway water of the ship. Furthermore, to improve the maneuverability of a ship, for example, a thruster can be provided in the bow- and/or stern-region. With favorable flow- and weather-conditions thrusters can make a cost-intensive use of tugboats unnecessary in docking maneuvers, in particular for the transverse movement of the ship. However, such thrusters require a transverse channel completely penetrating the ship hull below the waterline in the bow- or stern-region, whereby two extensive opposing openings arise.

Due to the end-side openings of the transverse channel, turbulences arise in the water that lead to an increase of the flow resistance of the hull in normal driving operation of a ship. In turn an increase unacceptable nowadays of fuel consumption results therefrom. A high significance is associated with this fact due to the often high travel speeds of cargo and passenger ships, which can fall in a range of 20 knots.

In order to reduce the flow resistance of a ship hull in normal driving operation, circular butterfly valves are known, for example, for the closing of the openings of a transverse channel of a thruster. Due to the rotating of the butterfly valves respectively disposed in the region of one of the two opposing openings of the transverse channel, in normal driving operation of the ship the openings can close nearly flush with the outer hull skin. In the maneuvering operation of the ship the butterfly valves are opened by rotating about their longitudinal center axis by 90°. In the fully opened state the butterfly valves are oriented parallel to the longitudinal direction of the transverse channel, so that a water flow generated by a drive propeller of the thruster can pass the butterfly valves largely unhindered due to their low material thickness in relation to the diameter of the transverse channel.

However, many years of experience with such butterfly valves have shown that in particular their bearing points generally disposed diametrically in the opening are subject to a high mechanical load due to the propeller slipstream of the thruster, external flow forces, and the impact of waves. Furthermore, the bearing points of the butterfly valves are permanently exposed to the corrosive fairway water. In themselves or in combination with one another, in the extreme case all influencing factors can lead to the complete failure of such a butterfly valve.

SUMMARY

An object of the invention is therefore to specify a low-maintenance and reliable cover device for an opening lying under water, which opening is in a hull of a watercraft. In addition, it is an object of the invention to specify a low-maintenance-as-possible thruster for a watercraft.

Since the cover device includes at least one volume-variable hollow-chamber lip assembly including at least two hollow-chamber lips and one buoyancy body, and the at least one hollow-chamber lip assembly is shiftable into an expansion state or into a shrinkage state by the supplying or the removal of a fluid, in particular air, a largely wear-free and low-maintenance design of the cover device is given that in particular manages without bearing- or hinge-points. Consequently a failure-free operation is given in corrosive media, in particular in seawater. In the expansion state the high pressure of the introduced fluid or medium ensures a sufficient dimensional stability of the hollow-chamber lip assembly and thus a reliable closure of the opening in the hull of the ship in normal driving operation. The cover device is preferably driven with compressed air or with air that is under a higher pressure than normal atmospheric pressure (1013 hPa) as fluid, which is generally always kept available on board ships. Other fluids, such as, for example, water, seawater, or oil can be used as fluid. In the expansion state—in the case of an opening with a circular cross-sectional geometry—the hollow-chamber lip assembly can have an approximately half-oval or tongue-type shaping. Alternatively, in the expansion state—in the case of an opening having a circular cross-sectional geometry—the hollow-chamber lip assembly can have an approximately rectangular or square shaping. All or individual hollow-chamber lips can preferably be brought in an expansion state and in a shrinkage state in order to shift the hollow-chamber lip assembly into an expansion state or into a shrinkage state. It is advantageous in the design of the hollow-chamber lip assembly from individual hollow-chamber lips that it is very robust with respect to external interfering influences during the opening- and closing-process. Even with a failure of a single hollow-chamber lip, the hollow-chamber lip assembly can still be shifted into an expansion state or into a shrinkage state.

In accordance with an advantageous further development it is provided that the hollow chamber lip assembly includes at least one flexible or pliable and high-tensile-strength shaping element. With reaching of the maximum expansion state the hollow-chamber lip assembly can thereby be conferred a shape that is defined and generally deviating from a balloon-shaped geometry, for example, mat-shaped. Here the shaping element can be disposed outside or inside the hollow-chamber lip assembly. A design is particularly preferred wherein shaping elements are respectively disposed inside the individual hollow-chamber lips. These shaping elements can be configured thread-type and determine the cross-section of the respective hollow-chamber lip in the expansion state. The size and the cross-sections of the individual hollow-chamber lips can differ here depending on the arrangement of the hollow-chamber lip with respect to the hollow-chamber lip assembly. Thus, for example, hollow-chamber lips in the region of a fixed end of the hollow-chamber lip assembly can have a larger cross-section than hollow-chamber lips in the region of a free end of the hollow-chamber lip assembly. Furthermore, hollow-chamber lips in the region of the fixed end can have a greater extension in the horizontal direction than in the vertical direction, and hollow-chamber lips in the region of the free end can have a greater extension in the vertical direction than in the horizontal direction.

The hollow-chamber lip assembly, or the hollow-chamber lips, is preferably formed with a fluid-tight and flexible surface structure. This makes possible a substantial design change of the hollow chamber lip by the supplying or the removal of the fluid. The surface structure can be, for example, a flexible and possibly elastic film or another fluid-tight, possibly rubberized textile material whose material thickness is small in relation to its surface extension. The individual hollow-chamber lips can alternatively be manufactured from a spacer fabric wherein threads that determine the shape of the respective hollow chamber are located inside the hollow-chamber lips. Here the individual hollow-chamber lips are connected to one another, for example, along a longitudinal extension, so that a hollow-chamber lip assembly arises in the shape of a plate. A desired shape of the hollow-chamber lip assembly in the expansion state is achieved by corresponding arrangement and gradation of the respective hollow-chamber lips with respect to one another.

According to one further development, in the expansion state of the hollow-chamber lip assembly the opening is essentially completely closed, and in the shrinkage state essentially completely unblocked. In the normal driving operation of a watercraft, in particular of a ship, the opening is thereby practically completely closed, so that an increase of the flow resistance of the hull in water is precluded to the greatest possible extent.

At least one bistable spring element is preferably disposed at least sectionally in the region of a free end of the hollow-chamber lip assembly. Due to the elastic and yet bistable element the change between the shrinkage state and the expansion state of the hollow-chamber lip assembly is supported. In the expansion state the free end of the hollow-chamber lip assembly extends essentially along a lower opening section facing the sea floor, and in the shrinkage state in the ideal case ends flush with an upper opening section directed away therefrom. The bistable spring element can be formed, for example, using rubber, using plastic, using a metal, in particular using spring steel, or a combination of the materials mentioned.

A change between the expansion state and the shrinkage state of the hollow-chamber lip assembly and vice versa is preferably effected rapidly due to the bistable spring element. As a result, intermediate states wherein the opening is only partially closed or unblocked by the cover device are traversed quickly. A suction of parts of the surface structure of the hollow chamber lip by the propeller of the thruster is thus reliably avoided.

Preferably at least two hollow-chamber lips are each equipped with a terminal for the supplying and/or discharging of the fluid. All hollow-chamber lips are preferably each equipped with a separate terminal. However, two or more individual hollow-chamber lips can also be fluidly connected to one another, so that a single terminal suffices for the filling and emptying for these chambers.

One preferred exemplary embodiment provides that the at least two hollow-chamber lips can be filled with fluid and/or emptied independently from one another via their terminal. It is preferably provided that the at least two hollow-chamber lips can be filled with fluid and/or emptied, temporally independently of one another, via their terminal. The at least two hollow-chamber lips can preferably be filled with different fluid and/or emptied via their terminal.

In one further development an abutment element having a small flow resistance, in particular a grid, is disposed in the opening at least in sections. In the expansion state a lateral supporting, acting at least on one side, of the hollow-chamber lip assembly in the direction of extension of the transverse channel is thereby ensured. This abutment element can be realized, for example, using grids, perforated metal plates, etc. The hollow-chamber lip assembly preferably abuts against the abutment element inside the transverse channel from inside.

In the case of one preferred embodiment, in the shrinkage state the at least one hollow-chamber lip assembly is completely receivable in a storage space, and in the expansion state the free end of the hollow-chamber lip assembly is receivable at least in sections in a recess in an interference-fit manner. It is ensured by the storage space that in the shrinkage state the hollow-chamber lip assembly withdraws completely from the cross-section of the opening and no relevant increase of the flow resistance occurs in operation of the thruster. Due to the recess an additional positional securing of the free end of the hollow-chamber lip assembly is ensured in its expansion state, which leads to a further improvement of the sealing functionality of the cover device. The preferably rectangular recess is generally provided in the region of a low point of the lower opening section of the opening. In the context of the description the term "low point" is understood to mean a fictitious point lying closest to the sea floor or a "lower" vertex of the semicircular cross-sectional geometry of the lower opening of the thruster.

The at least one buoyancy body is preferably disposed in the region of the free end of the hollow-chamber lip assembly and has a lower density than water. Due to the buoyancy force of the buoyancy body directed away from the sea floor or sea bed or acting against the force of gravity, the transition between the expansion state and the shrinkage state of the hollow-chamber lip assembly is supported. The buoyancy body can have, for example, the shape of a torus section. Furthermore, a plurality of buoyancy bodies can be provided disposed distributed over the free end of the hollow chamber lip, preferably spaced uniformly with respect to one another. One particularly advantageous design of the buoyancy body provides that a hollow-chamber lip, preferably the hollow-chamber lip forming the free end of the hollow-chamber lip assembly, represents the buoyancy body. Here in the expansion state of the hollow-chamber lip assembly the hollow-chamber lip forming the buoyancy body is preferably filled with compressed air. With emptying of the other hollow-chamber lips, due to its buoyancy the hollow-chamber lip forming the buoyancy body presses the other hollow-chamber lips upward and can optionally additionally support the emptying. The other hollow-chamber lips can also be filled with compressed air, but it would also be conceivable to provide, for example, surrounding seawater as fluid. This would have the advantage that the buoyancy of the fluid would not have to be worked against during filling. The individual hollow-chamber lips can preferably be, for example, shifted, filled, and emptied temporally independently, which supports the filling and the emptying. Thus the hollow-chamber lips forming the buoyancy body can preferably be filled last and/or emptied last. Furthermore, the hollow-chamber lip assembly can be brought into various final positions by a predetermined sequence during filling and/or emptying of the individual hollow-chamber lips. In one design of the buoyancy body as a hollow-chamber lip, further additional buoyancy bodies can be omitted.

In addition, the above-mentioned object is achieved by a thruster, in particular a bow- or stern-thruster.

Since the thruster for a watercraft includes at least one cover device according the disclosure, a thruster for a watercraft can be provided whose transverse channel including as a rule two openings can be closable and unblockable again in a reliable and low-maintenance manner. In normal driving operation, to minimize the flow resistance the openings can thereby be completely closed, and in maneuvering operations with active thrusters completely unblocked. The thruster can be embodied, for example, as a bow- or stern-thruster. The inventive cover devices thereby manage without mechanical hinge- and bearing-points prone to failure that frequently tend to fail. Furthermore no mechanical drive components prone to failure, such as, for example, drives or motors, are necessary for operation of the cover device.

In the drawings identical constructive elements have identical reference numbers.

DETAILED DESCRIPTION

Figure 1:
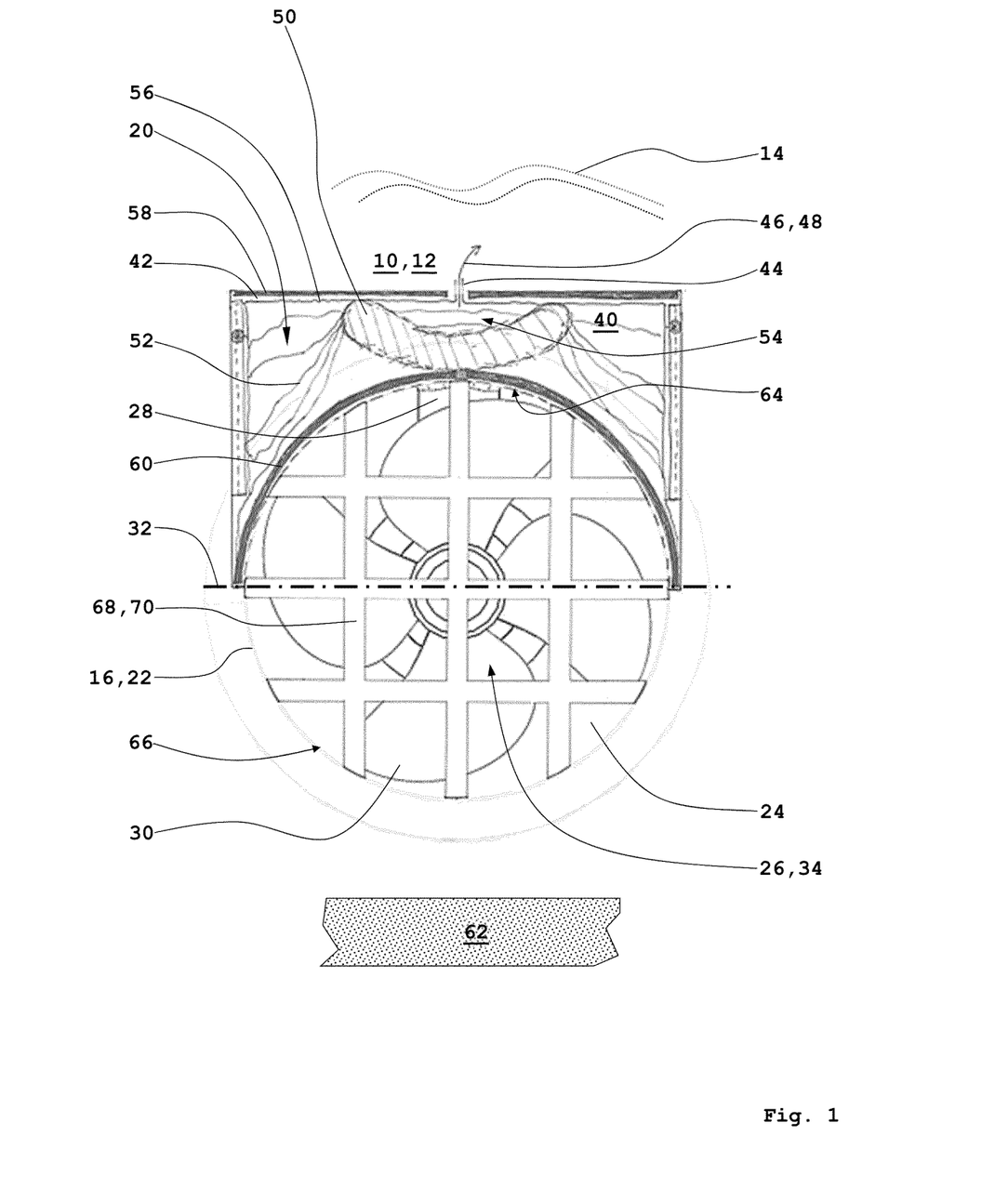
FIG. 1 shows a plan view of an opening lying under water of a thruster in a hull of a watercraft including its cover device in a complete shrinkage state.

FIG. 1 shows a plan view of a an opening lying under water of a thruster in a hull of a watercraft including its cover device in a complete shrinkage state.

In a hull 10 of a watercraft 12 formed exemplarily here as a ship, an opening 16 lying under water 14 is located having a circular cross-sectional geometry, which opening 16 is closable at times using an inventive cover device 20. The opening 16 is designed here only by way of example as a starboard- or port-side opening 22 of a transverse channel 24 of a thruster 26, which transverse channel 24 fully penetrates the hull 10. The thruster 26 includes a drive unit 28 for rotating driving of a propeller 30 in order to generate a strong water flow, necessary for easier maneuvering, in the transverse channel 24 extending transverse to a longitudinal axis 32 of the hull 10. Here the thruster 26 can be configured, for example, as a bow- or stern-thruster 34. In principle using the cover device 20 any openings lying under water in a hull of a watercraft can be closed.

The cover device 20 comprises, among other things, a variable-volume, approximately sack-shaped hollow chamber lip 40, which in the complete "shrinkage state" depicted here is completely received in a storage space 42 in the region of the hull 10 so that the opening 22 is completely unblocked, and with activated thruster 26 an impairment of the water flow in the transverse channel 24 is practically precluded.

Via a tubular connection 44 a fluid 46, which is preferably compressed air 48 or another gas, can be supplied to the hollow chamber lip 40 or discharged or sucked away therefrom. By a sufficient supply of compressed air 48 the hollow chamber lip 40 is shifted into the so-called "expansion state," i.e., a completely expanded state (see in particular FIG. 2), while the hollow chamber lip 40 is shiftable by the complete-as-possible sucking-out of the compressed air 48 into the so-called "shrinkage state" shown here.

In order to support the transition from the "expansion state" into the "shrinkage state," a buoyancy body 50 is integrated into the hollow chamber lip 40, the density of which buoyancy body is significantly lower than that of water. The hollow chamber lip 40 is constructed with a fluid-tight, foldable, as well as flexible-as-possible and possibly elastic surface structure 52. The buoyancy body 50 is exemplarily disposed here in the region of a free end 54 of the hollow chamber lip 40 and disposed outside thereof. A fixed end 56 of the hollow chamber lip 40, which fixed end 56 is directed away from the free end 54, is attached in the region of a top-side cover 58 of the storage space 42. The surface structure 52 of the hollow chamber lip 40 can be, for example, an optionally fiber-reinforced, high-strength plastic film or an elastomer film.

Furthermore, the hollow chamber lip includes a bistable spring element 60, e.g., a thick-walled plastic mat that in the "shrinkage state" depicted here essentially extends along an upper opening section 64 facing away from the sea floor 62 or the sea bed. The one bistable spring element 60 having essentially semicircular cross-sectional geometry serves to allow each change between the "shrinkage state" and the "expansion state" of the hollow chamber lip 40 to be effected without transition or as quickly as possible in the manner of the "clicker principle," in order to avoid intermediate states. Circumference-side a lower opening section 66 directed toward the sea floor 62 connects to the upper opening section 64. Here both the upper and the lower opening section 64, 66 respectively have an approximately semicylindrical shaping, which together form an approximately circular cross-sectional geometry of the transverse channel 24.

In addition an abutment element 70 exemplarily designed as a grid 68 is provided here that serves as a one-sided lateral guiding for the hollow chamber lip 40 in its fully expanded state or in the expansion state. Alternatively a further grid not depicted here can be provided that extends spaced parallel to the grid 68, so that in the expansion state of the hollow chamber lip 40 (see in particular FIG. 2)—which in normal driving operation of the watercraft or of the ship is usually set for closing of the opening 22 of the transverse channel 24—a particularly reliable two-sided guiding of the hollow chamber lip 40 between both grids is ensured.

Figure 2:
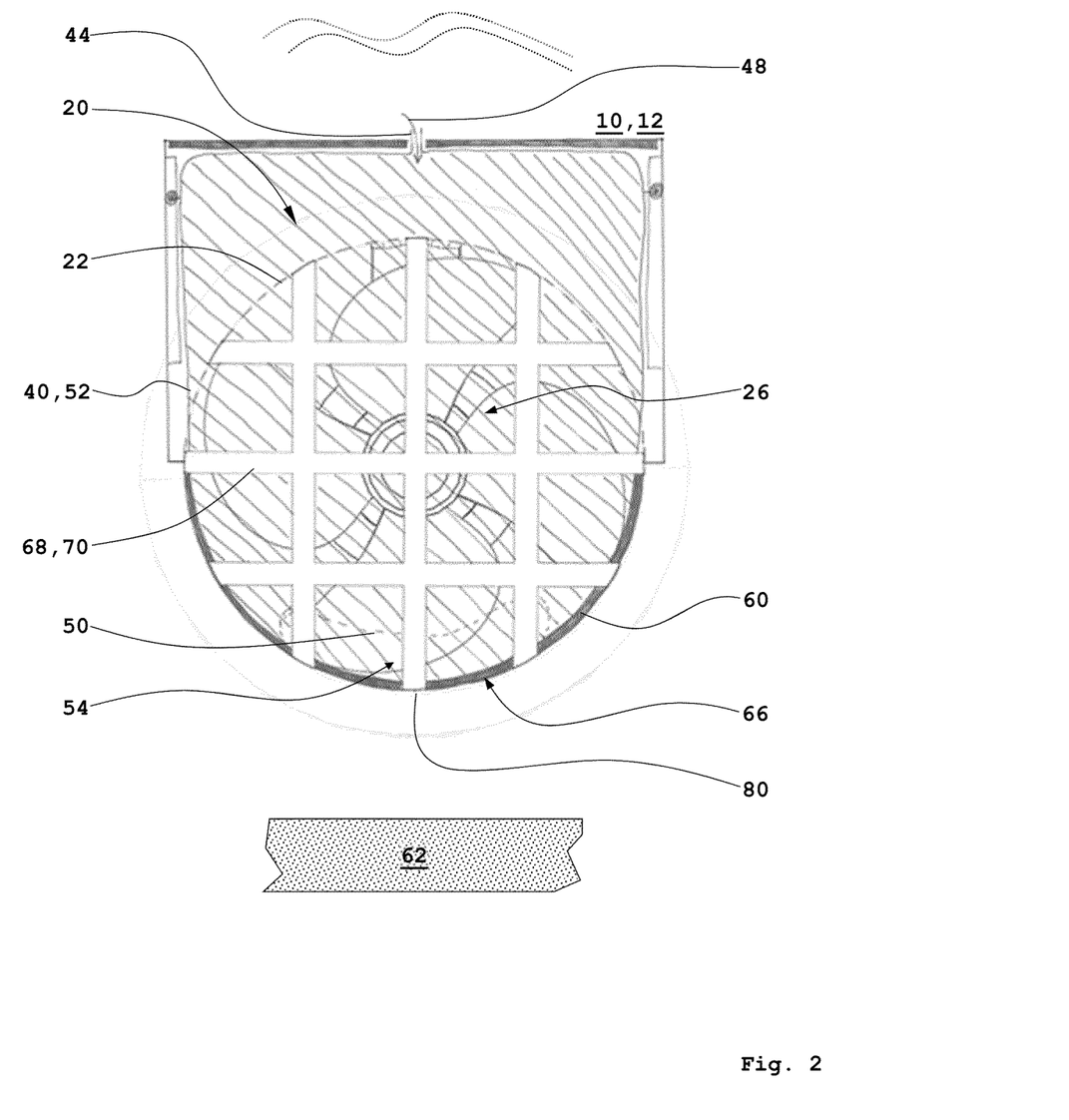
FIG. 2 shows a schematic plan view of the cover device of FIG. 1 in a fully expanded state.

FIG. 2 shows a schematic plan view of the cover device of FIG. 1 in the full "expansion state."

In the "expansion state" the free end 54 of the hollow chamber lip 40 or the bistable spring element 60 extends in the region of the lower opening section 66, whereby the opening 22 of the thruster 26 is practically completely closed and in normal driving operation no significant increase of the flow resistance of the hull 10 of the watercraft 12 results. In the "expansion state" the buoyancy body 50 is located in the region of a low point 80 of the lower opening section 66.

Here the tongue-shaped hollow chamber lip 40 is supported on one side on the grid 68. The change from the "shrinkage state" (see in particular FIG. 1) into the "expansion state" shown here of the hollow chamber lip 40 is effected by the supplying of compressed air 48 via the connection 44 into the sack-type surface structure 52 of the hollow chamber lip 40, which consequently inflates until reaching the full "expansion state."

With the transition from the "shrinkage state" into the "expansion state" the bistable spring element 50 springs abruptly or in a transitionless manner into the position shown here, which is mirror-symmetric with respect to the extension of the spring element 60 in the shrinkage state and in which to ensure an optimal sealing effect, in the ideal case the spring element 60 or the free, semicircular end 54 of the hollow chamber lip 40 abuts completely in the region of the lower opening section 66 of the opening 22 of the thruster 26.

Figure 3:
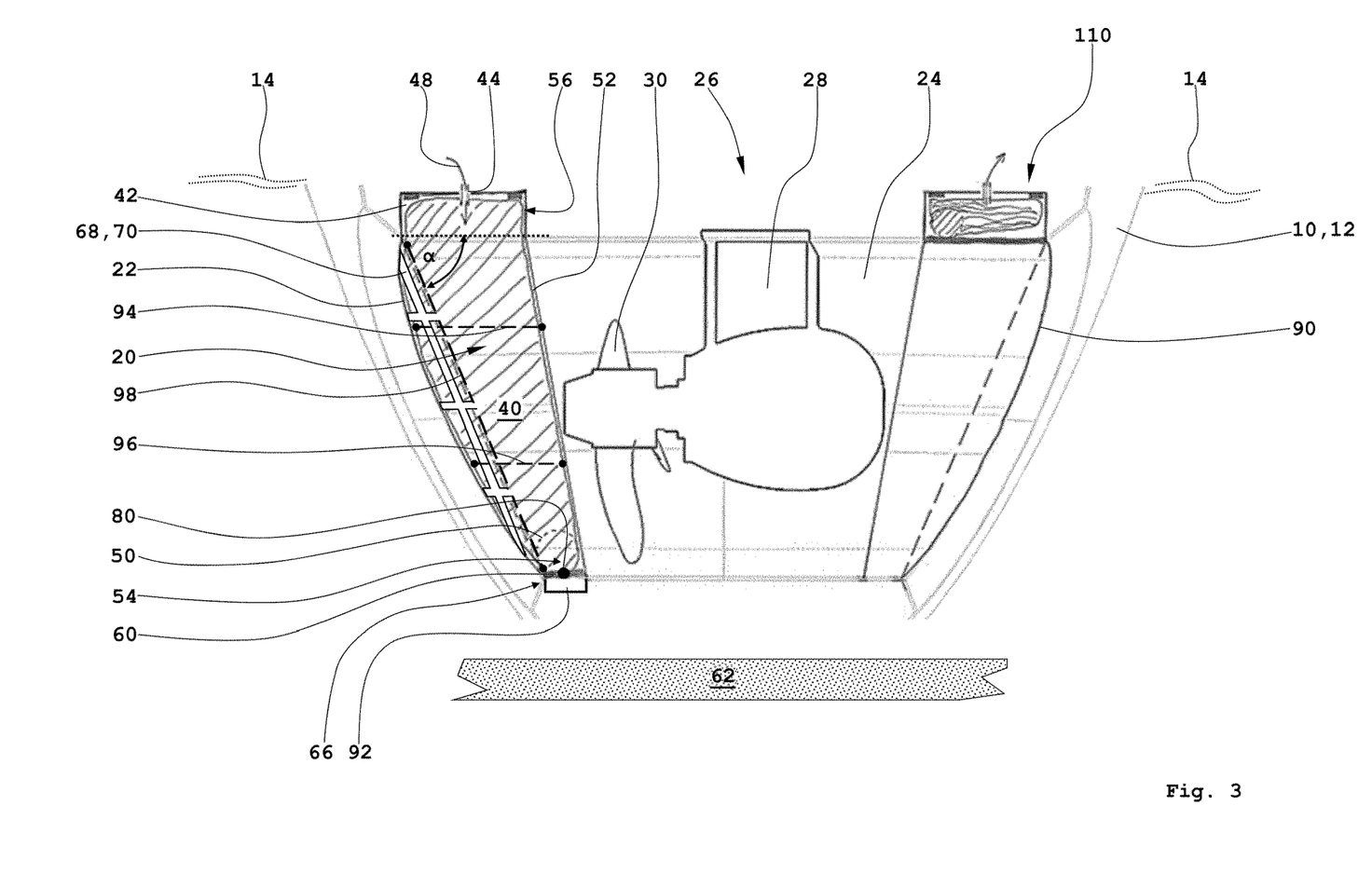
FIG. 3 shows a longitudinal section through the thruster including the cover device of FIGS. 1, 2 and a further cover device.

FIG. 3 shows a longitudinal section through the thruster including the cover device of FIGS. 1, 2 and a further cover device.

The thruster 26 comprises the transverse channel 24 fully penetrating the hull 10 of the watercraft 12 under water 14. The approximately hollow-cylindrical transverse channel 24 includes the opening 22 as well as a further opening 90 incorporated opposite thereto in the hull 10. The sea floor 62 lies spaced below the hull 10 of the watercraft 12. The propeller 30 including its drive unit 28 disposed at least partially outside the transverse channel 24 is located within the transverse channel 24 of the thruster 26.

The opening 22 of the transverse channel 24 is fully closed or covered by the cover device 20 found here in the "expansion state." Using the compressed air 48 constantly guided in or out via the connection 44 a permanent maintaining of the "expansion state" of the hollow chamber lip 40 is possible in normal driving operation of the watercraft 12.

The bistable spring element 60 and the buoyancy body 50 are located in the region of the free end 54 of the hollow chamber lip 40. Due to the abutment element 70 indicated in perspective here and realized here as grid 68 the hollow chamber lip 40 experiences a positional securing, so that it always ends flush with the hull 10 of the watercraft 12, and in normal driving operation a reliable closing of the opening 22 is ensured.

For further optimization of the positional securing of the hollow chamber lip 40, inside the opening 22 in the lower opening section 66 in the region of the low point 80 at least one, for example, rectangular recess 92, or a "trench" or a "trough" extending parallel to a ship longitudinal axis is provided, into which the free end 54 of the hollow chamber lip 40 is at least partially receivable or introducible thereinto by sections in an interference-fit manner in the "expansion state."

Within the hollow chamber lip 40 three, for example, band- or strip-type shaping element 94, 96, 98 are provided, here merely by way of example. These shaping elements 94, 96, 98 can support tensile forces, but no significant compressive forces, and serve to confer to the hollow chamber lip 40 in the expansion state a well-defined, e.g., mat- or mattress-type shape. The shaping elements 94, 96 preferably extend approximately parallel to the transverse channel 24, while the individual shaping element 98 extends at an angle α inclined here only approximately 85° with respect to the transverse channel 24. The shaping element 98 can be disposed, for example, between the bistable spring element 60 and the fixed end 56 of the hollow chamber lip 40, which fixed end 56 is fixed top-side in the storage space 42. The shaping elements 94, 96, and 98 can be constructed, for example, using textile bands having a high tensile strength.

Alternatively the shaping elements 94, 96, and 98 can be comprised of the same surface structure 52 as the hollow chamber lip 40 and be designed strip-shaped here.

The second opening 90 of the transverse channel 24 of the thruster 26 is closable using a further cover device 110. The cover device 110 for the opening 90 is embodied mirror-symmetric with respect to the cover device 20, but in contrast to the cover device 20 is located here in the "shrinkage state." Otherwise the constructive design and the functioning of the cover device 110 corresponds to that of the cover device 20 so that at this point in order to avoid repetitions of content reference is made to the explanations of the cover device 20 (see in particular FIGS. 1, 2). The hollow-chamber lip 40 of the cover device 20 need not necessarily be designed tapered downward, i.e. toward the lower opening section 66. The same applies for the other cover device 110.

Figure 4:
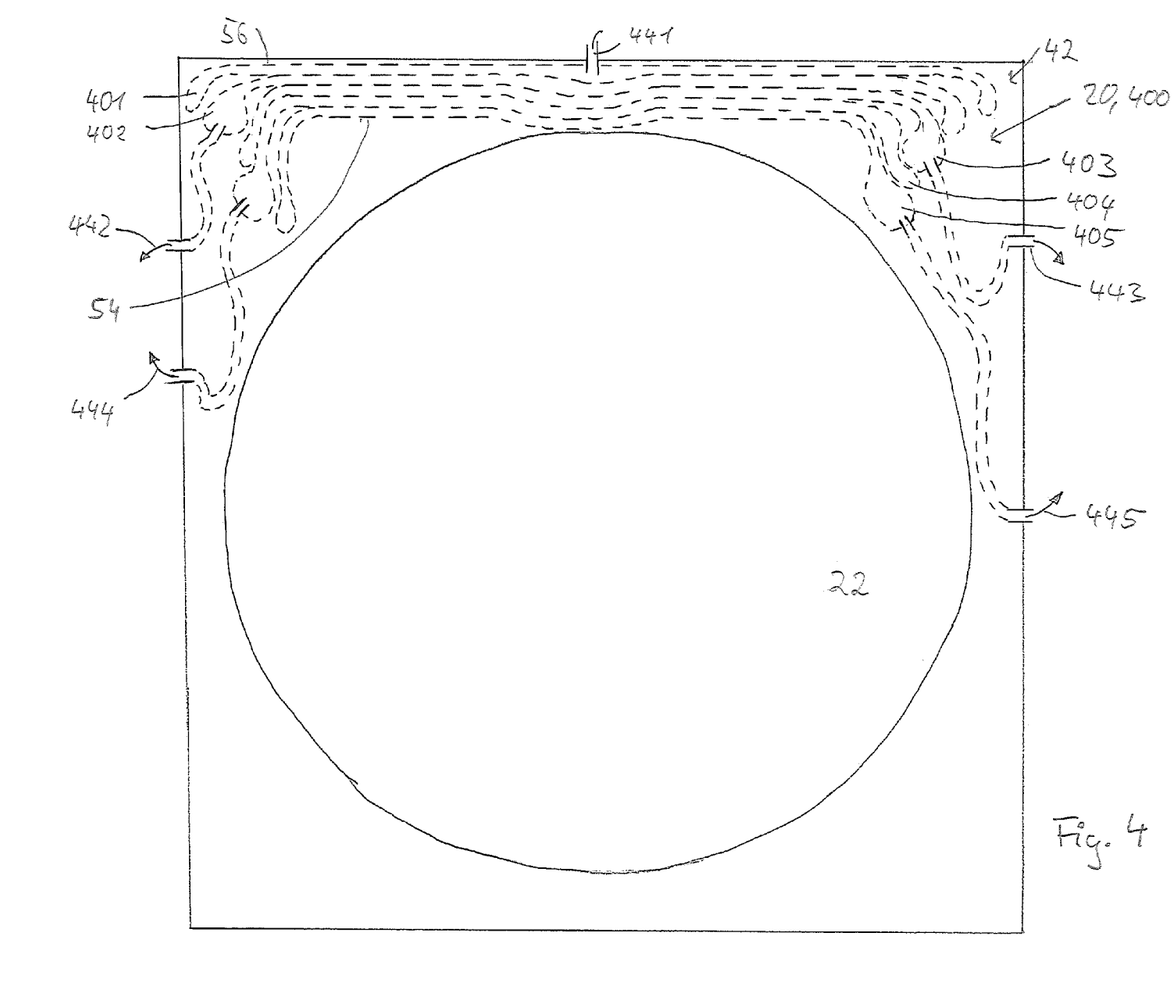
FIG. 4 shows a plan view of an opening lying under water of a thruster in a hull of a watercraft including an inventive cover device in a complete shrinkage state.

FIG. 4 illustrates a plan view of an opening lying under water of a thruster in a hull of a watercraft including an alternative cover device in a complete shrinkage state. In contrast to FIG. 1, not only one hollow-chamber lip 40 is provided here as hollow-chamber lip assembly, but rather the hollow-chamber lip assembly 400 includes five separate hollow-chamber lips 401, 402, 403, 404, 405. In the further description of FIGS. 4 to 7, only the differences with respect to FIGS. 1 to 3 are described.

The cover device 20 comprises, inter alia, a variable-volume hollow-chamber lip assembly 400, which in the complete "shrinkage state" depicted here is completely received in a storage space 42 in the region of the hull so that the opening 22 is completely unblocked, and with activated thruster an impairment of the water flow in the transverse channel is practically precluded. The five separate hollow-chamber lips 401, 402, 403, 404, 405 are all depicted in their complete "shrinkage state," whereby the hollow-chamber lip assembly 400 is also depicted in its complete "shrinkage state." The five separate hollow-chamber lips 401, 402, 403, 404, 405 each include a separate terminal 441, 442, 443, 444, 445 that is configured essentially hose-type, and tubular end-side, and via which a fluid, which is preferably compressed air or another gas, can be supplied to the individual hollow-chamber lips 401, 402, 403, 404, 405, or discharged or suctioned therefrom. The terminals 441, 442, 443, 444, 445 of all hollow-chamber lips are disposed on the hollow chamber lips 401, 402, 403, 404, 405 such that they lie outside the opening both in the "expansion state" and in the "shrinkage state." For this purpose the terminal 441 of the hollow-chamber lip 401, which terminal 441 forms the fixed end 56 of the hollow-chamber lip assembly 400, is disposed centrally on the hollow-chamber lip 401. The terminals 442, 443, 444 and 445 of the other hollow chambers are disposed alternately on the left and right on the lateral ends of the hollow-chamber lips 402, 403, 404, and 405 in a manner optimizing installation space and each connected to the hollow-chamber lips by a hose-type flexible intermediate piece.

By a sufficient supply of compressed air into all hollow-chamber lips 401, 402, 403, 404, 405, the hollow-chamber lip assembly 400 is shifted into the so-called "expansion state," i.e., a completely expanded state (cf. in particular FIG. 5), while the hollow-chamber lip assembly 40 is shiftable into the so-called "shrinkage state" shown here by the complete-as-possible sucking-away or discharging of the compressed air from all hollow-chamber lips 401, 402, 403, 404, 405).

A separate buoyancy body 50 supporting the transition from the "expansion state" into the "shrinkage state," as in FIGS. 1 to 3, is omitted in the exemplary embodiment of FIGS. 4 to 7. In FIGS. 4 to 7 the buoyancy body is formed by the hollow-chamber lip 405 forming the free end 54 of the hollow-chamber lip assembly 400. For this purpose the hollow-chamber lip 405 is impingeable with compressed air via its terminal 445 wherein the hollow-chamber lip 405 is completely emptied or brought into the "shrinkage state," preferably as the last of the hollow-chamber lips 401, 402, 403, 404, 405, with a transition from the "expansion state" into the "shrinkage state" of the hollow-chamber lip assembly 400. The hollow-chamber lip 405 filled with air thus represents the buoyancy body and lifts the emptied hollow-chamber lips 401, 402, 403, 404 into the storage space 42. However, a separate buoyancy body could also additionally be disposed in or on the hollow-chamber lip 405 in a supporting manner. However, a separate buoyancy body can also be completely omitted so that the hollow-chamber lip 401, or optionally further hollow-chamber lips, represent the sole buoyancy body or bodies. For example, with a successive emptying of the hollow-chamber lips from above to below, all further underlying hollow-chamber lips represent buoyancy bodies for the hollow-chamber lips lying above them.

A spring element 60, supporting the transition from the "expansion state" into the "shrinkage state" as shown in FIGS. 1 to 3, is omitted in the exemplary embodiments of FIGS. 4 to 7.

Figure 5:
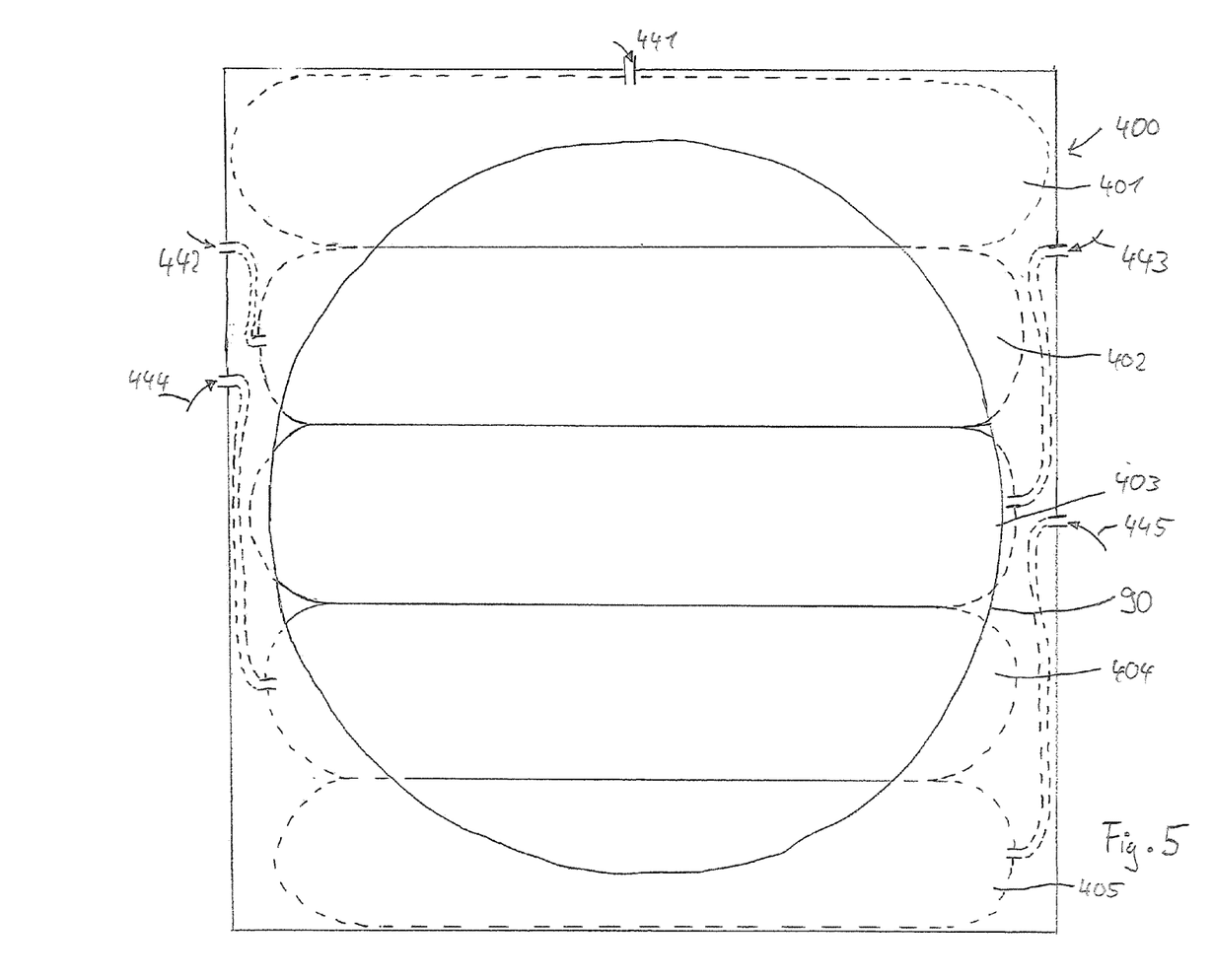
FIG. 5 shows a schematic plan view of the cover device of FIG. 4 in a complete expansion state.

FIG. 5 shows a schematic plan view of the cover device of FIG. 4 in the full "expansion state."

In the "expansion state" the free end 54 of the hollow-chamber lip assembly 400, which is formed by the hollow-chamber lip 405, extends in the region of the lower opening section, whereby the opening 22 of the thruster is practically completely closed, and in normal driving operation no significant increase arises of the flow resistance of the hull of the watercraft. In the "expansion state" the buoyancy body, which is formed by the hollow-chamber lip 405, is located in the region of a low point of the lower opening section.

The change from the "shrinkage state" (cf. in particular FIG. 4) into the "expansion state" shown here of the hollow-chamber lip assembly 400 is effected by the supplying of compressed air via the terminals 441, 442, 443, 444, 445 into the hose-type hollow-chamber lips 401, 402, 403, 404, 405, which consequently inflate until the complete "expansion state" is reached. In principle the upper hose-type hollow-chamber lips 401, 402, 403, 404 could be filled with seawater as fluid, and only the hollow-chamber lip 405 as buoyancy body be filled with compressed air in order to represent the functionality of cover device 20.

Figure 6:
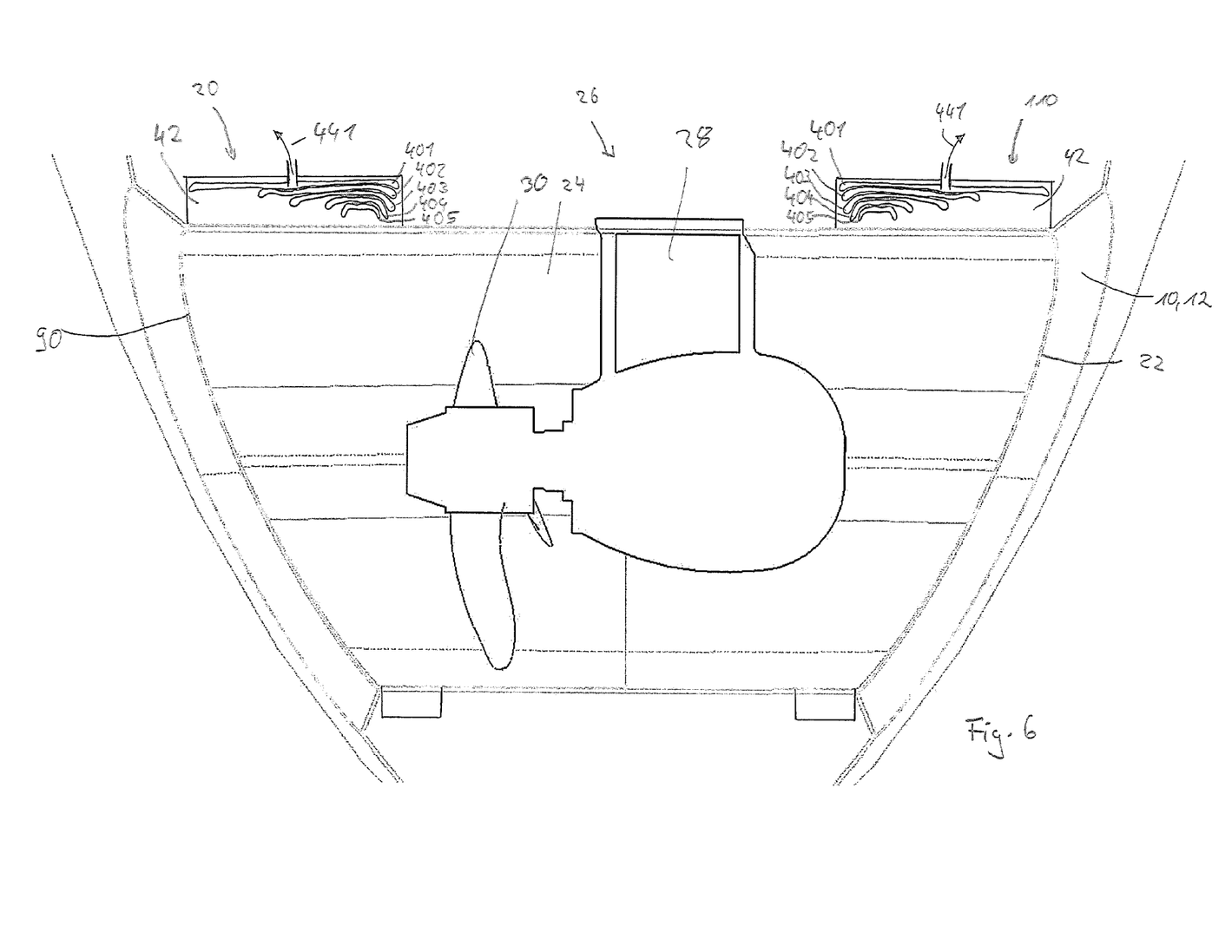
FIG. 6 shows a longitudinal section through the thruster including a further inventive cover device and a further cover device in a complete shrinkage state

FIG. 6 shows a longitudinal section through the thruster including a further inventive cover device and a further cover device in a complete shrinkage state The thruster 26 comprises the transverse channel 24 fully penetrating the hull 10 of the watercraft 12 under water 14. The approximately hollow-cylindrical transverse channel 24 includes the opening 22 as well as a further opening 90 incorporated opposite thereto in the hull 10. The sea floor lies spaced below the hull 10 of the watercraft 12. The propeller 30 including its drive unit 28 disposed at least partially outside the transverse channel 24 is located within the transverse channel 24 of the thruster 26.

The two cover device 20 and 110 for the openings 22 and 90 of the transverse channel 24 are configured mirror-symmetrical with respect to each other and are in the "shrinkage state." The cover devices 20 and 110 are essentially comprised of the hollow-chamber lips 401, 402, 403, 404, 405, which can receive different volumes and also require different volumes in the storage space 42 in the "shrinkage state." The hollow-chamber lips 401, 402, 403, 404, 405 are each fillable with compressed air via separate terminals, wherein in FIG. 6 only the terminal 441 of the uppermost hollow-chamber lip 401 is shown.

Figure 7:
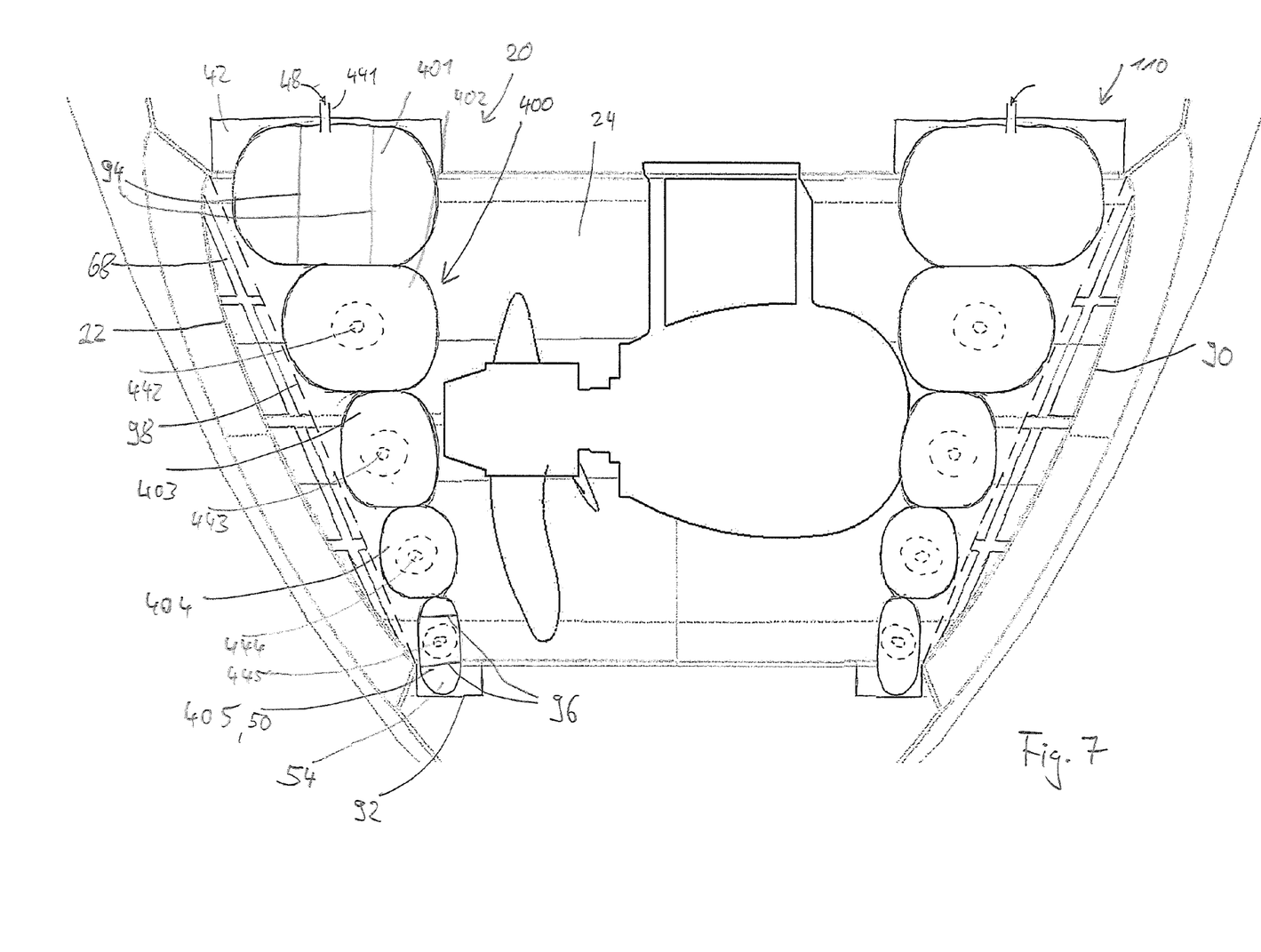
FIG. 7 shows a longitudinal section through the thruster including the cover devices of FIG. 6 in a complete expansion state.

FIG. 7 shows a longitudinal section through the thruster including the cover devices of FIG. 6 in a complete expansion state The opening 22 of the transverse channel 24 is fully closed or covered by the cover device 20 found here in the "expansion state." Using the continually supplied or refreshed compressed air 48 a permanent maintenance of the "expansion state" of the hollow-chamber lips 401, 402, 403, 404, 405 forming the hollow-chamber lip assembly 400 is possible in normal driving operation of the watercraft 12.

The hollow-chamber lip 405 in the region of the free end 54 of the hollow-chamber lip assembly 400 forms a buoyancy body 50. Due to the abutment element indicated in perspective here and realized here as grid 68 the hollow chamber lips 401, 402, 403, 404, 405 experience a lateral positional securing, so that they always end flush with the hull 10 of the watercraft 12, and in normal driving operation a reliable closing of the opening 22 is ensured. The hollow-chamber lips 401, 402, 403, 404, 405 abut one-side on the grid 68 inside the transverse channel 24.

For further optimization of the positional securing of the hollow-chamber lip assembly 400 inside the opening 22, in the lower opening section 66 in the region of the low point at least one, for example, rectangular recess 92, or a "trench" or a "trough" extending parallel to a ship longitudinal axis is provided, into which the lowermost hollow-chamber lip 445, which forms the free end 54 of the hollow chamber lip 400 in the "expansion state," is at least sectionally receivable in an interference-fit manner or introducible therein.

Here, only by way of example, two, for example, thread-, band-, or strip-shaped shaping elements 94 are provided inside the hollow-chamber lip 401. Only by way of example, two, for example, thread-, band-, or strip-shaped shaping elements 96 are also disposed inside the hollow-chamber lip 405. It is understood that the other hollow-chamber lips 402, 403, 404 can also include shaping elements. Furthermore a further shaping element 98, which traverses the hollow-chamber lips 401, 402, 403, 404, 405, is disposed outside the hollow-chamber lips. These shaping elements 94, 96, 98 can support tensile forces, but no significant compressive forces, and serve to confer to the hollow-chamber lip assembly 404 in the expansion state a well-defined, e.g., mat- or mattress-type shape. The shaping elements 94, 96, and 98 can be constructed, for example, using textile bands having a high tensile strength. Alternatively the shaping elements 94, 96, and 98 can be comprised of the same surface structure 52 as the hollow-chamber lips 401, 402, 403, 404, 405 and be designed strip-shaped here.

Alternatively the hollow-chamber lips can be comprised of a spacer fabric, and the shaping elements 94, 96 of appropriate threads.

The second opening 90 of the transverse channel 24 of the thruster is closed by a further cover device 110 that is configured mirror-symmetrical with respect to the cover device 20 and is also in the "expansion state." Otherwise the constructive design and the functioning of the cover device 110 correspond to that of the cover device 20 so that at this point—in order to avoid repetitions of content—reference is made to the explanations of the cover device 20. The hollow-chamber lips 401, 402, 403, 404, 405 of the cover devices 20, 110 need not, as shown in FIG. 5, have the same axial length, whereby in the "expansion state" the hollow-chamber lip assembly 400 is configured rectangular or square, but rather can also have different lengths, for example, downward, i.e., decreasing lengths from the hollow-chamber lip 401 toward the hollow-chamber lip 405, whereby a hollow-chamber lip assembly 400 configured tapered downward, i.e., toward the lower opening section, can be represented.

Deviating from the possibility, presented in FIGS. 1 to 7 only by way of example, of closing the two-sided openings of a transverse channel of a thruster using one each of the inventive cover devices, using the inventive cover device other openings lying below the waterline of a ship can be designed closable using the inventive cover device.

For example, reference is made here to the possibility of a cover device for an opening for a stabilizer of a ship wherein the stabilizer is accommodated in a stabilizer chamber and is disposed therein in a pivotable-in-and-out manner. An alternative, not-depicted design of the cover device can be configured here such that the one cover device includes two hollow-chamber lip assemblies separated from each other, which each include a plurality of hollow-chamber lips that are volume-variable by the supplying or discharging of a fluid, and the two hollow-chamber lip assemblies are thereby shiftable into an expansion state or into a shrinkage state. Here the two hollow-chamber lip assemblies each include a fixed and a free end, wherein the fixed ends are disposed on the upper and on the lower opening section and the two free ends, which are each representable by a hollow-chamber lip, move toward each other toward the center of the opening during filling of the hollow-chamber lip assembly, and in the expansion state either abut against each other in a central region of the opening and thus close the opening, or each abut against a surface of the stabilizer and thus close the opening. At least for the upper of the two hollow-chamber lip assemblies a hollow-chamber lip forming the free end can form a buoyancy body that can be used in a supporting manner during the emptying of the hollow-chamber lip assembly.

Due to the constructively simple design of the variable-volume or inflatable hollow-chamber lip assembly—which manages substantially without mechanically movable components in the narrower sense, in particular bearing points, hinge points, motors, and drives—a longer-lifespan, more reliable, and lower-maintenance operation of the cover device is ensured.

The invention relates to a cover device for at least sectional closing of an opening lying under water in a hull of a watercraft, in particular an opening of a transverse channel of a thruster. According to the invention the cover device includes at least one variable-volume hollow-chamber lip assembly including at least two hollow-chamber lips, and the at least two hollow-chamber lips are shiftable into an expansion state or into a shrinkage state by the supplying or the removal of a fluid, in particular air. As a result of the variable-volume or inflatable cover device a more reliable and simultaneously lower-maintenance operation of the cover device is given. In addition, the invention has a thruster, in particular a bow- or stern-thruster, as subject matter.

REFERENCE NUMBER LIST

10. Hull
12. Watercraft
14. Water
16. Opening (general)
20. Cover device
22. Opening (transverse channel)
24. Transverse channel (thruster)
26. Thruster
28. Drive unit
30. Propeller
32. Longitudinal axis (hull)
34. Bow- or stern-thruster
40. Hollow-chamber lip
42. Storage space
44. Terminal
46. Fluid
48. Compressed air (air)
50. Buoyancy body
52. Surface structure
54. Free end
56. Fixed end
58. Cover (storage space)
60. Bistable spring element
62. Sea floor
64. Upper opening section
66. Lower opening section
68. Grid
70. Abutment element
80. Low point
90. Opening (transverse channel)
92. Recess
94. Shaping element
96. Shaping element
98. Shaping element
110. Cover device
400. Hollow-chamber lip assembly
401. Hollow-chamber lip
402. Hollow-chamber lip
403. Hollow-chamber lip
404. Hollow-chamber lip
405. Hollow-chamber lip
441. Terminal
442. Terminal
443. Terminal
444. Terminal
445. Terminal

The invention claimed is:

1. A cover device for at least partially closing an underwater opening in a hull of a watercraft, comprising:
a variable-volume hollow-chamber lip assembly including at least two hollow-chamber lips and a buoyancy body,
wherein the at least two hollow-chamber lips are volume-variable by supplying a fluid to or removing the fluid from an interior thereof,
wherein the hollow-chamber lip assembly is shiftable between an expanded state and a contracted state,
wherein the buoyancy body has a density lower than a density of water, and
wherein the buoyancy body is connected to the at least two hollow-chamber lips such that when the buoyancy body and the at least two hollow-chamber lips are submerged in water the buoyancy body produces a buoyancy force on the at least two hollow-chamber lips sufficient to press the hollow-chamber lip assembly toward the contracted state.

2. The cover device according to claim 1, wherein the at least one hollow-chamber lip assembly includes at least one flexible and high-tensile-strength shaping element.

3. The cover device according to claim 1, wherein the at least two hollow-chamber lips are constructed with a fluid-tight and flexible surface structure.

4. The cover device according to claim 1, wherein, in the expanded state the opening is substantially completely closed, and in the contracted state the opening is substantially completely unblocked.

5. The cover device according to claim 1, wherein each of the at least two hollow-chamber lips includes a terminal for supplying and/or discharging the fluid.

6. The cover device according to claim 5, wherein the at least two hollow-chamber lips are configured to be filled with the fluid, and/or emptied, independently of one another via their respective terminal.

7. The cover device according to claim 1, wherein a grid is disposed at least sectionally in the opening.

8. The cover device according to claim 1, wherein in the contracted state the at least one hollow-chamber lip assembly is completely received in a storage space, and in the expanded state a free end of the hollow-chamber lip assembly is received at least sectionally in a recess in an interference-fit manner.

9. A cover device for at least partially closing an underwater opening in a hull of a watercraft includes a variable-volume hollow-chamber lip assembly including at least two hollow-chamber lips and one buoyancy body, wherein the at least two hollow-chamber lips are volume-variable by supplying a fluid to or removing a fluid from an interior thereof, and the hollow-chamber lip assembly is shiftable between an expanded state and a contracted state, and
wherein the buoyancy body is disposed in a region of a free end of the hollow-chamber lip assembly, wherein the buoyancy body has a lower density than water, and wherein the buoyancy body is configured to produce a buoyancy force that supports a transition between the expanded state and the contracted state of the hollow-chamber lip assembly.

10. A bow or stern thruster for a watercraft, including at least one cover device according to claim 1 for covering at least one opening of a transverse channel of the thruster.

11. The cover device according to claim 1,
wherein the hollow-chamber lip assembly includes at least one flexible and high-tensile-strength shaping element,
wherein the at least two hollow-chamber lips are constructed with a fluid-tight and flexible surface structure,
wherein, in the expanded state the opening is substantially completely closed, and in the contracted state the opening is substantially completely unblocked,
wherein each of the at least two hollow-chamber lips includes a terminal for supplying and/or discharging the fluid,
wherein the at least two hollow-chamber lips are configured to be filled with a fluid, and/or emptied, independently of one another via their respective terminal,
wherein a grid is disposed at least sectionally in the opening,
wherein in the contracted state the hollow-chamber lip assembly is completely received in a storage space, and in the expanded state a free end of the hollow-chamber lip assembly is received at least sectionally in a recess in an interference-fit manner, and
wherein the buoyancy body is disposed in a region of a free end of the hollow-chamber lip assembly.

12. The cover device according to claim 9,
wherein the buoyancy body is configured to produce a buoyancy force that supports a transition from the expanded state to the contracted state of the hollow-chamber lip assembly.

13. A cover device mountable at an underwater opening in a hull of a watercraft, the opening having a top and a bottom, the cover device comprising:
a plurality of variable-volume hollow-chamber lips including an upper hollow-chamber lip connected at the top of the opening, a lower hollow-chamber lip and at least one middle hollow-chamber lip connected between the upper hollow-chamber lip and the lower hollow-chamber lip,
wherein each of the hollow-chamber lips is configured to be expanded by supplying at least one fluid thereto and to be contracted by removing the at least one fluid therefrom,
wherein the cover device has a contracted configuration in which the plurality of hollow-chamber lips do not cover the opening or cover only a first portion of the opening and an expanded configuration in which the plurality of hollow-chamber lips cover a second portion of the opening greater than the first portion of the opening,
wherein the cover device is configured such that supplying the at least one fluid to the upper hollow-chamber lip and to the at least one middle hollow-chamber lip moves the lower hollow-chamber lip away from the top of the opening and shifts the cover device from the contracted configuration to the expanded configuration, and
wherein, when the at least one fluid in the lower hollow-chamber lip is a gas and the lower hollow-chamber lip and the at least one middle hollow-chamber lip are submerged in water, the lower hollow-chamber lip forms a buoyancy body pressing the at least one middle hollow-chamber lip toward the top of the opening.

14. The cover device according to claim 13, wherein the at least one fluid in each of the plurality of variable-volume hollow-chamber lips is the gas.

15. The cover device according to claim 13,
including a bistable spring element shiftable from a first position holding the plurality of variable-volume hollow-chamber lips in the contracted configuration and a second position holding the plurality of plurality of variable-volume hollow-chamber lips in the expanded configuration.

16. The cover device according to claim 13, wherein each of the variable-volume hollow-chamber lips includes a terminal for supplying and/or discharging the at least one fluid.

17. The cover device according to claim 16, wherein the variable-volume hollow-chamber lips are configured to be filled with the at least one fluid and/or emptied of the at least one fluid independently of one another via their respective terminal.

18. A method comprising:
installing the cover device according to claim 13 at the underwater opening in the hull of the watercraft,
filling each of the plurality of variable-volume hollow-chamber lips with the at least one fluid to shift the cover device from the contracted configuration toward the expanded configuration, the at least one fluid in the lower hollow-chamber lip being a gas, and
removing the at least one fluid from the upper variable-volume hollow-chamber lip and from the at least one middle variable-volume hollow-chamber lip so that a buoyancy of the gas-containing lower variable-volume hollow-chamber lip presses the middle variable-volume hollow-chamber toward the upper variable-volume hollow-chamber and shifts the cover device toward the contracted configuration.

* * * * *